United States Patent [19]

Burger et al.

[11] Patent Number: 4,522,067
[45] Date of Patent: Jun. 11, 1985

[54] THIN-FILM STRAIN GAUGE

[75] Inventors: Kurt Burger, Friolzheim; Heiko Gruner, Gerlingen, both of Fed. Rep. of Germany

[73] Assignee: Robert Bosch GmbH, Stuttgart, Fed. Rep. of Germany

[21] Appl. No.: 420,258

[22] PCT Filed: Dec. 18, 1981

[86] PCT No.: PCT/DE81/00228
§ 371 Date: Sep. 17, 1982
§ 102(e) Date: Sep. 17, 1982

[87] PCT Pub. No.: WO82/03458
PCT Pub. Date: Oct. 14, 1982

[30] Foreign Application Priority Data

Apr. 4, 1981 [DE] Fed. Rep. of Germany ....... 3113745

[51] Int. Cl.³ .......................... G01L 1/22; G01L 9/04; H01C 17/12
[52] U.S. Cl. .................................. 73/862.65; 73/726; 338/3
[58] Field of Search ...................... 73/766, 767, 862.65, 73/862.67, 720, 726; 338/2, 3, 4

[56] References Cited

U.S. PATENT DOCUMENTS 3,242,006 3/1966 Gerstenberg .
3,251,222 5/1966 Fenner ................. 338/2 X
3,303,693 2/1967 Stedman ................ 73/766
3,341,794 9/1967 Stedman .......... 73/862.67 X
4,325,048 4/1982 Zaghi et al. .......... 73/862.65
4,329,878 5/1982 Utner et al. ............. 73/766

FOREIGN PATENT DOCUMENTS 16251 10/1980 Fed. Rep. of Germany .
2057215 5/1971 France .
1067475 5/1967 United Kingdom .

Primary Examiner—James J. Gill
Attorney, Agent, or Firm—Frishauf, Holtz, Goodman & Woodward

[57] ABSTRACT

A thin-film strain gauge and a method for producing it are proposed; the strain gauge is advantageously capable of integration into a thin-film circuit. The strain gauge comprises an elastically deformable spring element in combination with at least one elongation-sensitive resistor. The resistor disposition (R1-R4), the low-impedance connections (L11-L42) between the various resistance regions and the associated connection tracks (L5-L8) are applied in a vacuum process, preferably by cathode sputtering. The low-impedance connections (L11-L42) and the connection tracks (L5-L8) are of material which, although different from the material making up the actual resistance region, still has approximately the same temperature coefficient of resistance, so as to preclude errors caused by temperature.

15 Claims, 5 Drawing Figures

THIN-FILM STRAIN GAUGE

The invention relates generally to a thin-film strain gauge and more particularly to a gauge having elongation-sensitive resistors arranged in a Wheatstone bridge.

BACKGROUND

Strain gauges of this type are known, both in conventional form having wire or foil resistance elements and in the field of thin-film technology. Elastically deformable spring elements are used in a known manner in combination with at least one resistor which is sensitive to elongation; the spring elements are deflectable either at one end or centrally, stretchable in the longitudinal direction, or otherwise capable of being deformed. Four elongation-sensitive resistors are frequently interconnected to make a Wheatstone bridge, in order to increase the accuracy of measurement.

It is furthermore known to fabricate the resistance elements from a material or combination of materials such that the electric resistor has a low temperature coefficient, so that errors in measurement caused by temperature fluctuations are prevented; temperature fluctuations are perceived in the same manner as deflections of the element. Strain gauges have already been used in conventional technology where both the resistance elements and some of the leads are fabricated of constantan; however, in that case, losses in the measurement signal occurred on the leads.

THE INVENTION

Briefly, the thin-film strain gauge of the present invention has vacuum-deposited resistors and leads with similar temperature coefficients of resistance and has many critical advantages over the prior art. In particular, the temperature errors resulting from differences in temperature coefficients of the electrical resistances of the leads and the resistance regions are quite substantially avoided. Virtually no increased track resistance has to be tolerated, and thus no reduction in the measurement sensitivity of the resistor or of the bridge. Since both the low-impedance connections between the various resistance regions and the associated connecting leads can be fabricated of identical material, both sources of possible error can be eliminated. By fabricating the various elements using thermal vapor depositing or cathode sputtering, a means is attained which is tailor-made for thin-film technology and can be integrated without difficulty with another thin-film circuit on the same substrate. The production process is particularly simple. The makeup of the connection tracks for the external electric connections can be of any arbitrary embodiment, retaining a variety of possible types of bonding of the thin-film strain gauge; connections can be effected by soldering, cool-soldering or welding, for instance, depending on the conditions under which the measurement bridge will be used.

The proposal according to the invention results in an apparatus comprising an adherent metallization system for thin-film strain gauges and thin-film circuits which can be tinned and/or leaded and/or reinforced by electroplating, the production process being particularly economical. Expensive pretreatments of the surfaces of the elastically deformable spring elements are not required, especially when thin, high-impedance glass insulation layers are pressed on in two separate operations. The double pressing process results in a poreless insulating layer, and the individual layers are advantageously fired separately. This firing process may also be utilized, at no additional expense, for hardening copper-beryllium spring element substrates in the same operation.

DRAWINGS

DETAILED DESCRIPTION

Figure 1:
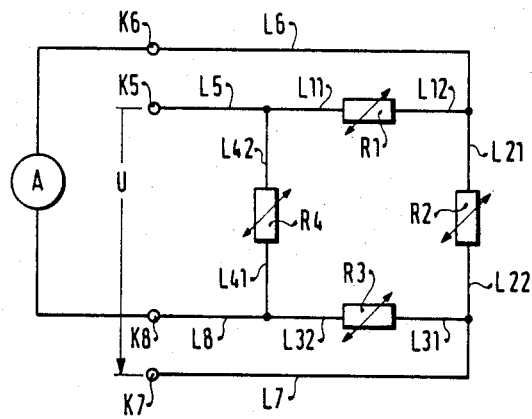
FIG. 1 shows the basic layout of a circuit in which elongation-sensitive strips are arranged in a Wheatstone bridge.

FIG. 1 shows a bridge circuit having four elongation-sensitive resistors R1, R2, R3 and R4. These resistors are interconnected electrically via short, low-impedance connections L11, L12, L21, L22, L31, L41 and L42. From the connecting points, connection tracks L5, L6, L7 and L8 lead to external bonding points K5, K6, K7 and K8. The supply voltage U is applied to points K5 and K7; the measurement signal is picked up in the bridge diagonal at the bonding points K6 and K8.

The resistors R1–R4 form the thin-film strain gauges which are disposed in a Wheatstone bridge. Naturally, a measurement may also be performed with only a single resistor R, the measurement signal then being picked up as a voltage change at this resistor. With the disposition according to the invention, it is particularly possible to produce a precision thin-film strain measuring apparatus which can be integrated into a thin-film circuit and is usable, for instance, for measuring force, pressure, travel, weight or acceleration. In order not to attenuate the measurement signal, the various resistors R1–R4 should be interconnected with low impedance, and the connection tracks L5–L8 leading to the bonding points K5–K8 should also be as low in impedance as possible. However, in addition to the need for low-impedance connections, the quite substantial need exists for the electrical connections to be of some material or combination of materials having a low temperature coefficient of the electrical resistance, which is virtually not different from the temperature coefficient of the resistance regions, so that no measurement error which would correspond to an apparent deflection of the spring elements will occur as a consequence of temperature fluctuations. This is particularly the case if relatively long tracks are required; for reasons having to do with adhesion, for instance, the bonding of the bridge cannot be effected directly in the vicinity of the stretched spring element. To this end, not only the resistors R1–R4 but also the low-impedance connections L11–L42 and the connection tracks L5–L8 are fabricated of resistance material, but one which is different from that making up the actual resistors R1–R4. No other thin-film contact metallizations which are otherwise conventional, such as copper, nickel or gold or laminated combinations of highly conductive metals, are suitable for precision thin-film strain gauges, because they have temperature coefficients which are greater by a factor of 1000 than that of the resistance layer, causing errors which are not merely negligible.

Figure 2:
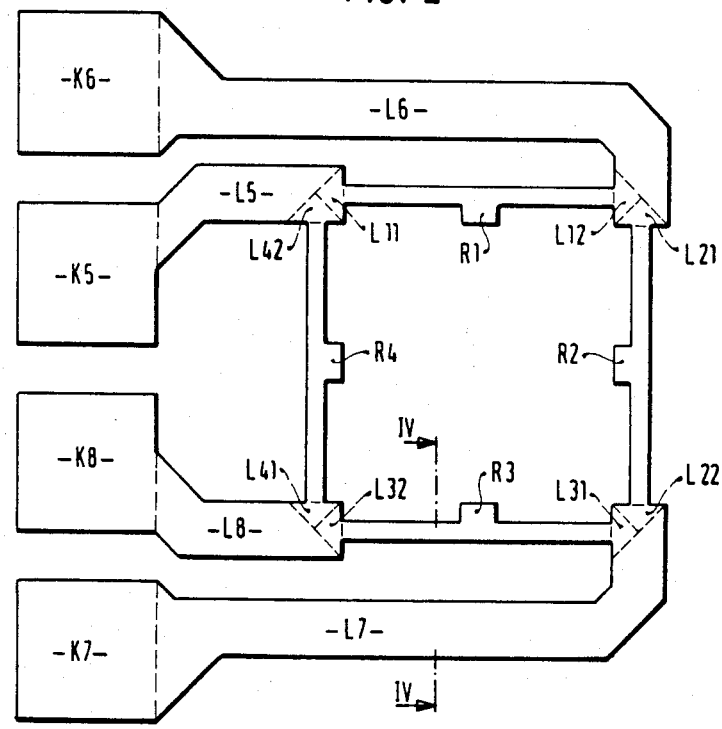
FIG. 2 shows a thin-film strain gauge bridge disposed such that it is deflectable at one end.

FIG. 2 shows a first exemplary embodiment of the invention, in which both the low-impedance connections L11-L42 and the various resistance regions R1-R4 as well as the associated connection tracks L5-L8 are applied in the form of a thin layer by means of cathode sputtering. The strain gauge shown in FIG. 2 is fabricated in the form of a disposition which is deflectable at one end—on the right in the drawing; as a result, elongation of the resistors R1 and R3 occurs, while the resistors R2 and R4 remain substantially unchanged in the event of deflections.

Figure 3:
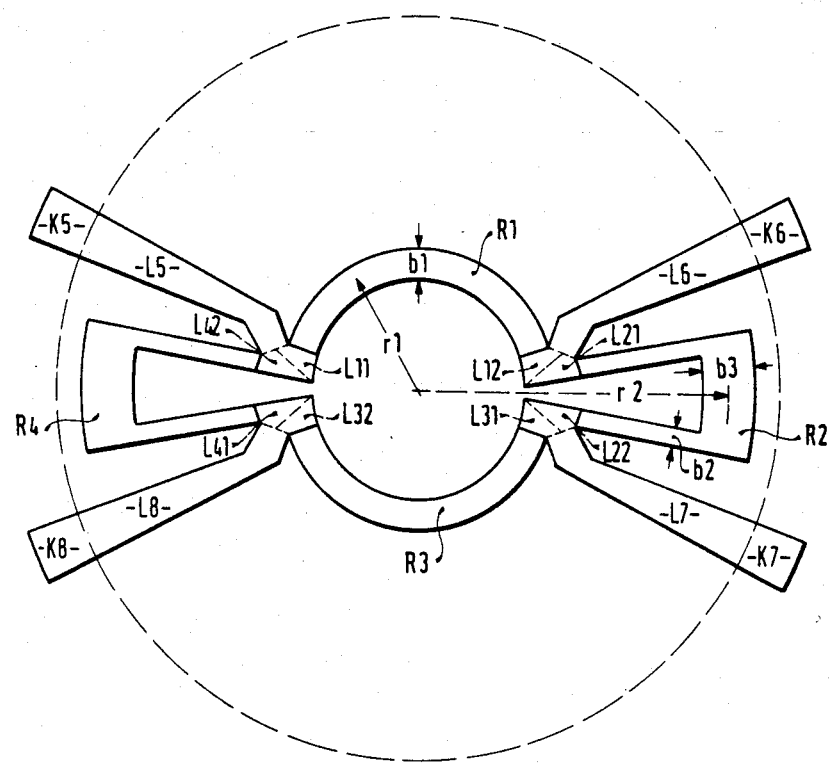
FIG. 3 shows a centrally deflectable disposition on a membrane-like Spring element.

FIG. 3 shows a disposition of a thin-film strain gauge having a symmetrical structure, which is suitable for central deflection and is embodied by way of example, in the region encompassed by dashed lines, as an elongatable membrane. Identical elements are identified by the same reference numerals as in FIGS. 1 and 2. The four strain gauges of the bridge circuit are formed, in this disposition, by two tangentally elongated resistors R1 and R3 and two resistors R2 and R4 which are elongated in the radial direction. The low-impedance connections L11-L42 and the connection tracks L5-L8 are adapted for the altered geometry and are carried to the outside at two different ends. Because of the symmetrical disposition, they do not cause any errors in measurement.

In the dispositions shown in FIGS. 2 and 3, the temperature coefficients of resistance (TCR) of the resistance materials used for the elongation-sensitive resistors R1-R4, the low-impedance connections L11-L42 and the connection tracks L5-L8 are of the same order of magnitude. The low-impedance connections L11-L42 and the connection tracks L5-L8 are of constantan, in which nitrogen and/or air has been incorporated from the residual gas during the sputtering or vapor-depositing process. Particularly suitable as materials for the elongation-sensitive resistors R1-R4 are tantalum nitride ($Ta_2N$, TaN) and/or tantalum oxynitride ($TaO_xN_y$), which is likewise produced during atomization or vapor-depositing from tantalum by reaction with nitrogen and/or air in the residual gas and has approximately the same temperature coefficient as the doped constantan. The elongation-sensitive resistors R1-R4 can be applied to a thin, organic foil, which is glued to an elastically deformable spring element, particularly if spring elements with uneven surfaces are being used. The spring element is not shown in FIGS. 2 and 3; the form of a spring element which is particularly applicable in a disposition according to FIG. 2 is shown in FIG. 5, which is discussed further below.

Figure 4:
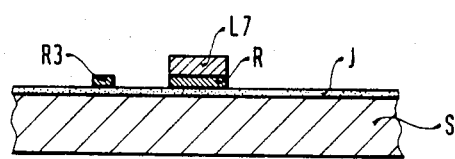
FIG. 4 is a section taken along the line IV—IV of FIG. 2.

Even more advantageous than the application of the thin-film strain gauge on the spring element with the aid of a coated foil is the direct vapor-depositing or sputtering of the thin layers onto a spring element, which then has to be provided beforehand with an insulation layer; this process is particularly recommended for spring elements without a curved surface. This insulation layer is seen in FIG. 4, where it is marked I. The section taken along the line IV—IV of FIG. 2 produces the disposition shown in FIG. 4, where the spring element acting as the substrate is marked S. The insulation layer I rests, adhering firmly, on the spring element S, and the resistance material R, R3 is disposed over the insulation layer I; over the resistance material is the connection track L7, which in the present instance is fabricated of constantan of appropriate width and thickness, so as to attain a sufficiently low resistance for the connection line. The insulation layer I is made of a poreless, thin, high-impedance glass insulation layer, which is applied directly onto the spring element S, in particular onto a copper beryllium (CuBe) spring plate.

Figure 5:
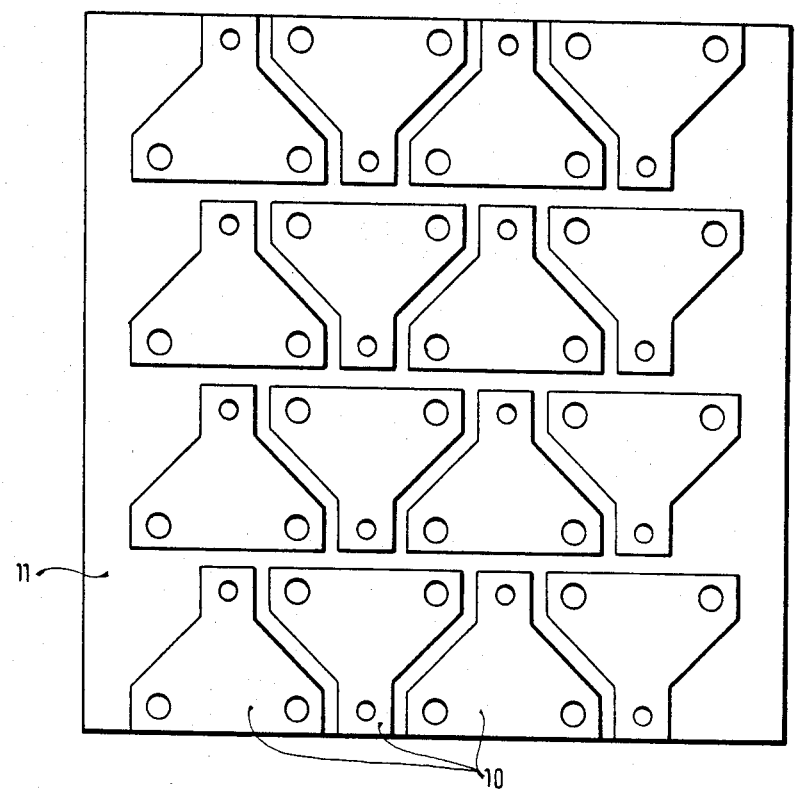
FIG. 5 shows a disposition having a multiplicity of spring elements with thin-film strain gauges, before they are separated into individual elements.

FIG. 5 illustrates the fabrication of the individual thin-film strain gauges shown in FIG. 2. The individual elements are segments of a plate 11, which is the larger unit of fabrication at first. The plate 11 is made of copper-beryllium spring material and, in the disposition shown in FIG. 5, is 3 inches by 3 inches in size, as is conventional in thin-film metallization and photo-etching technology. Approximately 16 triangular spring elements 10 can be made from one plate 11. In contrast to the previously conventional process of separating the elements by etching, the individual elements 10 are separated from one another here by the more-economical stamping process; although known in principle, stamping has not heretofore been used, despite its processing advantages, for separating thin-film elements of this kind because of the brittleness of the elements and the fear of damage-induced rejects. In particular, the steps required for a further masked etching process, which account for the majority of the additional expense in separation by etching, are eliminated in the process of separation by stamping. The stamping is effected after all the steps of producing the finished measurement bridge have been performed. The sole factor of importance here is that the surface covered by the glass insulation layer I, and thus the thin-film metallization as well, be at least 1 mm away from all the stamped rims; this presents no difficulties in the screen printing process.

In terms of the process of producing the thin-film strain gauges, it has proved particularly advantageous for an insulating intermediate layer I applied onto the spring element S to have first a resistance layer R and then a conductive layer L of resistance material, preferably constantan, applied over its entire surface. These layers may be formed by vapor-depositing or by sputtering; the following discussion relates to a layer which has been produced by means of cathode sputtering. In further processing to produce the finished strain gauges as shown in FIG. 2 or FIG. 3, the overall structure of the resistance and track regions is first created in a first etching step; then in a second etching step, the track material is selectively removed from the resistance regions by etching. If the substrate is a foil, which is applied subsequently onto the spring element, then it is recommended that the foil be applied reversibly, prior to the metallization, to a stable carrier, such as a glass plate, so that the photo-etching process can be performed in a simple manner after metallization has been performed. The track regions L11-L42 and L5-L8 are applied as a discharge gas, which is mixed with nitrogen and/or air, in a reactive sputtering process in an argon atmosphere, beginning with constantan doped with nitrogen and/or air. In a single operation, the conversion of the cathode material, tantalum, to tantalum nitride ($Ta_2N$, TaN) or perhaps tantalum oxynitride ($TaO_xN_y$) occurs first, forming the resistance layer; then in addition, in the same atmosphere which has been doped with nitrogen and/or air, the production of the track segments is accomplished. The track segments comprise constantan doped with nitrogen and/or air, which in this manner is given a temperature coefficient which is approximately equal to the temperature coefficient of the resistance layer. While pure constantan has a temperature coefficient of approximately 10 ppm/°K., the constantan sputtered with 1% nitrogen in the discharge gas, for instance, has a temperature coefficient of −80 ppm/°K., which corresponds to the temperature coefficient of the tantalum nitride layer for the resistors which has been formed by sputtering using this discharge composition. Thus the resistance layer R and the track layer L are applied in the same reactive vacuum cycle. In a high-frequency sputtering system, for instance, it is a thus possible for two different cathodes to be formed by sputtering, one from tantalum and one from constantan, at the same time, and the spring elements which are to be coated can then be moved by a transporting mechanism past first the tantalum cathode and then the constantan cathode. The desired thicknesses are realized with the aid of the cathode size and the resultant different sputtering rates and times; simultaneously with the creation of the constantan layer by sputtering, a thermal pre-aging of the resistance layer of tantalum nitride or tantalum oxynitride is accomplished.

The insulation layer I is fabricated of at least two glass layers applied one after another, in the manner of a multiple run in the screen printing process, and then fired. By means of two or more separate screen printing processes, a poreless insulation layer I is attained without pretreating the spring element S underlying it. When the glass insulation layer I is fired, moreover, a hardening of the spring element S is attained without undergoing additional expense.

The constantan layer for the track regions L11–L42 and L5–L8 has a cross section sufficient to assure the necessary conductivity. The disposition in FIG. 4 schematically shows the dimensional relationships: An elastically deformable substrate having a thickness on the order of magnitude of a few hundred μm first has the glass insulation layer I pressed onto it in a firmly adhering manner; the layer I has a thickness of 15 to 50 μm. The resistance layer, for instance of tantalum nitride, has a thickness in the range of ≦0.1 μm and is preferably approximately 0.5 μm thick; the constantan layer above it has a thickness of approximately 0.2 to 0.5 μm. These dimensions must naturally be adapted to given uses. The structure of the thin-film strain gauge according to the invention thus suppresses an apparent elongation of the measuring resistors at a variable temperature. The disposition of the various resistors in a measurement bridge furthermore compensates for the variation in resistance which is caused exclusively by thermal elongation of the spring element and which is therefore misleading.

In addition to the advantages of the proposed combination of layers which have already been discussed, the fact that, if any residues from etching the constantan layer remain on the measuring resistor layer, for instance from incorrect placement of the masking during the photo-etching process, the measuring resistor will not vary in its temperature coefficient from the other bridge resistors which are free of residues, is also quite favorable. In contact layers heretofore used, this condition caused the rejection of the bridge for precision measurements under variable ambient temperature conditions, although the bridge resistors were equilibrated.

We claim:

1. A temperature-compensated thin-film strain gauge, particularly a precision thin-film strain gauge capable of integration into a thin-film circuit, for measuring force, pressure, displacement, weight, or acceleration, having an elastically deformable spring device (10, S) in combination with at least one elongation-sensitive resistor element, having at least one deflectable resistance region (R1, R3) and one substantially non-deflecting resistance region (R2, R4);

at least one low-impedance connection element (L11–L42) connecting at least said resistance regions (R1, R3; R2, R4); and connection tracks (L5–L8), wherein, to simplify production and facilitate integration of the gauge in a larger thin-film circuit, at least one of:

the resistor element disposition (R1, R4);

the low-impedance connections (L11–L42) between the various resistance regions; and associated connection tracks (L5–L8) are applied by means of at least one of thermal vapor deposition and cathode sputtering; and wherein, to prevent temperature fluctuations from giving rise to erroneous strain change measurements, the temperature coefficients of resistance (TCR's) of the materials used for the elongation-sensitive resistor element (R1–R4) and at least one of the low-impedance connections (L11–L42) and the connection tracks (L5–l8) are of the same order of magnitude; and wherein, to prevent loss of measurement signal strength, at least one of:

the low-impedance connections (L11–L42); and the connection tracks (L5–L8) are of material which is different from the material of the resistance element regions (R1–R4).

2. Strain gauge according to claim 1, wherein the at least one elongation-sensitive resistor element comprises four elongation-sensitive resistors (R1, R4) combined into a Wheatstone bridge.

3. Strain gauge according to claim 1, wherein at least one of:

the low-impedance connections (L11–L42);

the connection tracks (L5–L8) comprise constantan doped with nitrogen.

4. Strain gauge according to claim 3, wherein the at least one elongation-sensitive resistor element comprises four elongation-sensitive resistors (R1, R4) combined into a Wheatstone bridge.

5. Strain gauge according to claim 1, wherein the at least one elongation-sensitive resistor element (L1–L4) comprises tantalum nitride ($Ta_2N$, $TaN$); or tantalum oxynitride ($TaO_xN_y$); or tantalum nitride and tantalum oxynitride.

6. Strain gauge according to claim 5, wherein the at least one elongation-sensitive resistor element comprises four elongation-sensitive resistors (R1, R4) combined into a Wheatsone bridge.

7. Strain gauge according to claim 1, wherein the spring device (10) is an elastically deformable device;

a thin organic foil is adhesively connected to said spring device;

and the elongation sensitive resistor element (R1–R4) is applied on the thin organic foil.

8. Strain gauge according to claim 7, wherein the at least one elongation-sensitive resistor element comprises four elongation-sensitive resistors (R1, R4) combined into a Wheatstone bridge.

9. Strain gauge according to claim 1, further including an insulation layer (I) interposed between the spring device (10S) and the elongation-sensitive resistor element (R1, R4) vapor-deposited or sputtered on the insulation layer.

10. Strain gauge according to claim 9, wherein the at least one elongation-sensitive resistor element comprises
    four elongation-sensitive resistors (R1, R4) combined into a Wheatstone bridge.

11. Strain gauge according to claim 1, wherein said elongation-sensitive resistor elements (R1, R4) are connected in a Wheatstone bridge configuration, located in a rectangular disposition having two elongatable resistance regions (R1, R3) and two non-elongatable resistance regions (R2, R4), said resistance regions being applied onto the spring device (10);
    and wherein the spring device is deflectable at one end.

12. Strain gauge according to claim 11, wherein at least one of:
    the low-impedance connections (L11–L42);
    the connection tracks (L5–L8) comprise constantan doped with nitrogen;
    and wherein the at least one elongation-sensitive resistor element (L1–L4) comprises
    tantalum nitride ($Ta_2N$, $TaN$); or tantalum oxynitride ($TaO_xN_y$); or tantalum nitride and tantalum oxynitride.

13. Strain gauge according to claim 1, wherein said elongation-resistance resistance element (R1, R4) is connected in a Wheatstone bridge configuration having two resistance regions (R1, R3) shaped to be approximately semicircular, and being tangentially elongatable, and two resistance regions (R2, R4) which are radially elongatable, and approximately U-shaped;
    and the spring device comprises a round membrane on which said elongation-sensitive resistance element is applied.

14. Strain gauge according to claim 1, further including a poreless thin high-impedance glass insulation layer (I) being applied to the spring device (S);
    and wherein the elongation-sensitive resistance element (R1, R4) is applied over the glass insulation layer.

15. Strain gauge according to claim 14, wherein the spring device comprises a copper-beryllium (CuBe) spring plate.

* * * * *